United States Patent [19]
Mack

[11] Patent Number: 5,992,758
[45] Date of Patent: Nov. 30, 1999

[54] PROXIMITY DETECTOR FOR GROUND-BASED IMPLEMENTS

[75] Inventor: Alexander R. Mack, Ottawa, Canada

[73] Assignee: Agro-mack Enterprises Ltd., Ottawa, Canada

[21] Appl. No.: 09/072,770

[22] Filed: May 6, 1998

Related U.S. Application Data

[63] Continuation-in-part of application No. 08/717,887, Sep. 23, 1996, abandoned.

[51] Int. Cl.⁶ .................................................... B05B 1/20
[52] U.S. Cl. ............................................................ 239/159
[58] Field of Search ................................... 239/739, 740, 239/63, 159, 172, 150

[56] References Cited

U.S. PATENT DOCUMENTS

| | | | |
|---|---|---|---|
| 3,211,381 | 10/1965 | Rusmussen | 239/159 |
| 3,339,843 | 9/1967 | Horton | 239/157 |
| 3,882,268 | 5/1975 | Ogawa et al. | 178/6 |
| 4,011,914 | 3/1977 | Elmer | 172/126 |
| 4,225,226 | 9/1980 | Davidson | 351/1 |
| 4,463,906 | 8/1984 | Reinke et al. | 239/739 |
| 4,526,236 | 7/1985 | Jacobsen | 172/126 |
| 4,555,725 | 11/1985 | Geiersback | 358/93 |
| 4,879,732 | 11/1989 | Dorosz | 377/24.2 |
| 5,133,500 | 7/1992 | Simpson | 230/150 |
| 5,155,683 | 10/1992 | Rahim | 364/424.02 |
| 5,160,977 | 11/1992 | Noriyuki | 356/376 |
| 5,170,849 | 12/1992 | Nikkel | 172/6 |
| 5,176,320 | 1/1993 | Krauss | 239/2.2 |
| 5,207,739 | 5/1993 | Orthman | 172/5 |
| 5,222,324 | 6/1993 | O'Neall | 47/1.7 |
| 5,277,839 | 1/1994 | Schultz | 252/301.24 |
| 5,279,068 | 1/1994 | Rees | 47/1.7 |
| 5,289,321 | 2/1994 | Secor | 359/896 |
| 5,294,664 | 3/1994 | Morrison | 524/560 |
| 5,299,413 | 4/1994 | Gale | 56/10.2 |
| 5,338,129 | 8/1994 | Oden | 404/9 |
| 5,351,044 | 9/1994 | Mathur | 340/901 |
| 5,381,187 | 1/1995 | Takamatsu | 348/759 |
| 5,429,061 | 7/1995 | Bourgeois | 406/130 |
| 5,455,685 | 10/1995 | Mori | 348/363 |
| 5,459,511 | 10/1995 | Sehara et al. | 348/335 |
| 5,528,263 | 6/1996 | Platzkea | 345/156 |
| 5,555,464 | 9/1996 | Hatlestad | 348/266 |
| 5,585,626 | 12/1996 | Beck | 250/222.1 |
| 5,636,792 | 6/1997 | Sauter | 239/172 |
| 5,666,893 | 9/1997 | Bourgeois | 74/527 |
| 5,686,722 | 11/1997 | Dubois et al. | 250/226 |
| 5,734,335 | 3/1998 | Brogi | 340/870.05 |

FOREIGN PATENT DOCUMENTS

| | | | |
|---|---|---|---|
| 1282145 | 3/1918 | Canada | 33/63 |
| 1079195 | 3/1984 | U.S.S.R. | 239/739 |

OTHER PUBLICATIONS

Brach, E.J., A. R. Mack and V.R. RAO 1979. "Normalization of Radiance data for studying crop spectra over time with a mobile field spectroradimeter" vol. 5. No.1 Canadian Journal of Remote Sensing, May 1979.

Mack, A.R., EJ. Brach, and V.R. Rao "Investigation of crop spectra and selection of optimal spectral channels" Canadian Journal of Spectroscopy. vol. 23 No. 2 Mar./Apr. 1978.

(List continued on next page.)

*Primary Examiner*—Kevin Weldon

[57] ABSTRACT

A proximity detecting system for use with an agricultural equipment or implement such as a crop sprayer, for determining the position of the implement, e.g. the end of a spraying boom relative to the edge of the previously cultivated or sprayed area. The system has an electronic imaging device, e.g. a CCD array, mounted at the end of the implement or sprayer, which shows the location of a marker placed at the edge of a previously cultivated or processed swath. The position of the marker is shown on a visual display located in the operator's cab. A deviation of the marker from a predetermined position on the display alerts the operator of an overlap with, or miss, of the boundary of the previously processed swath.

7 Claims, 1 Drawing Sheet

OTHER PUBLICATIONS

Mack, A.R., EJ Brach and V.R. Rao. 1984 "Appraisal of multispectral scanner systems from analysis of high–resolution plant spectra" International Journal of Remote Sensing 1984, vol. 5 No. 2 279–288.

Panneton, Bernard Ph.D. "Detection of swath markin dyes by optical Devices" Horticultural Research and Development Centre. Spray Application Technology Laboratory, 1995.

PROXIMITY DETECTOR FOR GROUND-BASED IMPLEMENTS

Cross-reference to related applications: this application is a continuation-in-part of U.S. Ser. No. 08/717,887 filed Sep. 23, 1996 now abandoned.

FIELD OF THE INVENTION

This invention relates to a position detecting system for a ground-riding vehicle, and more particularly, to a system for detecting the proximity of the vehicle or an implement of the vehicle to a predetermined boundary on the ground, especially a boundary which is not visible by an operator of the vehicle.

BACKGROUND OF THE INVENTION

In agriculture, farm sprayers, chemical applicators, seeders and other machinery are drawn or propelled over the ground. The ground is generally uneven, and often quite rough. In the operation of the machinery or equipment, it is essential that the area covered by the operation of the equipment, e.g. a fertilizer sprayer, is as contiguous as practically possible to an area already treated. It is obvious that overlapping would result in a loss of the medium (e.g. fertilizer or seed) distributed by the machinery, or an excessive application of the medium (deleterious to the cultivation), or both. On the other hand, leaving an untreated area would result in losses due to incomplete treatment. In other words, due to costs of the materials and the need to properly control the vegetation, insects etc., high application or treatment efficiency must be sought.

Typically, an operator of the vehicle watches the proximity of a specific working implement of the vehicle, e.g. the end of a sprayer boom, to the edge of a previously sprayed strip. The operator adjusts the direction of the vehicle accordingly. To facilitate the operator's task of viewing the boundary of the previously treated area, or another predetermined boundary, e.g. the edge of the field, it has already been proposed to apply an optical marking at the edge of the boundary. An example of an apparatus for such purpose is described in U.S. Pat. No. 3,339,843 issued Sep. 5, 1967 to Horton. A dye is sprayed at the end of a sprayer boom which is carried by a vehicle. The operator adjusts the direction of the vehicle while viewing the marking left by the dye.

This task becomes arduous or virtually impossible as the size of the working implement, e.g. the length of a working boom, becomes significant. Agricultural machinery now in use can reach the span in the range of 240 feet (or 120 feet boom length on each side of the vehicle). The accuracy of visually determining the position of the marking by the operator diminishes with distance between the operator and the marking. The view of the marker may also become obscured by the vegetation.

U.S. Pat. No. 3,211,381 to Rasmussen teaches discharging a chemical marker with the material being spread or sprayed.

U.S. Pat. No. 4,011,914 to Elmer shows a device for physically marking the outer limits of the sprayer boom, having a sled-type marking means at the extremities of the spreader.

Other marking arrangements are disclosed in U.S. Pat. No. 4,526,236 to Jacobsen, U.S. Pat. Nos. 5,429,061 and 5,666,893 to Bourgeois, U.S. Pat. No. 5,338,129 to Oden and U.S. Pat. No. 5,133,500 to Simpson. The Oden and Simpson patents teach the use of a colored foam to mark various surfaces.

A crop sensing device is disclosed in U.S. Pat. No. 5,279,068 to Rees. The device uses infra-red (IR) transmitters and receivers to position the agricultural equipment in the correct position relative to rows of plants. IR beams are used to activate actuators to move the tools to the desired relationship with the rows.

Control of individual spray nozzles using separate near-infrared transmitters and receivers is proposed in U.S. Pat. No. 5,222,324 to O'Neall.

A non-contact radiant energy device is presented in U.S. Pat. No. 5,176,320 to Krauss for controlling the amount of water applied during snowmaking.

U.S. Pat. No. 5,155,683 to Rahim proposes a remote control guidance system to maneuver equipment around obstacles using a television camera to send images of the area to a screen at the vehicle operator's station.

A system for determining the position of a vehicle on highways described in U.S. Pat. No. 5,351,044 to Mathur. This system is quite complicated and not suitable for the agricultural field environment.

To summarize, the prior art teaches various ways to mark the boundary of an agricultural processed area to avoid an overlap or incomplete coverage in further operation. The art assumes that the boundary can be seen directly by the operator. When the working implement reaches a significant length (e.g. about 120 feet), operator's visibility ceases to be reliable, regardless of the operator's visual acuity. No solution is offered in the prior art for this situation.

It is known that numerous spectral changes occur in agricultural fields over the growing season. In more lay terms, the vegetation changes color between green and dark brown, grey, yellow etc. depending on the crop maturity. The spectral variation has been shown to exist between around 360 and 1000 nm. Further, the illumination of the field can change significantly over time.

The possibilities of television are well known. In theory, it should be possible to provide a good television-based solution to enable the operator to evaluate the proximity of a specific remote part (e.g. the end of the long spraying boom) of the equipment to a pre-arranged boundary, e.g. a foam marker. However, the solution is much too sophisticated and expensive, and not compatible with the ruggedness of agricultural environment. It is important that any equipment intended to help the operator to determine the position of the boundary at a distant location (at the end of an implement etc.) is reliable but rugged enough to withstand the vibration, dust, dirt and shocks typical to the operation of agricultural equipment. In balancing the precision of the equipment and its cost, the latter factor should be given a clear preference. As mentioned above, the spectral properties of the soil and vegetation and illumination changes should also be accounted for.

SUMMARY OF THE INVENTION

It is an object of the invention to provide a low-cost device and system for displaying an image, typically a black-and-white one, of the proximity of an agricultural implement or a similar equipment to a field marking which has been placed do delineate a boundary for an area which has been processed (sprayed, cultivated etc.), the image to be viewed by the operator of the equipment.

According to the invention, there is provided a system to be associated with a ground-riding equipment, typically an agricultural equipment or implement, for detecting a proximity of the equipment with an optical marking on the ground.

The system comprises: a photo-electric sensor means disposed on the equipment remotely from an operator of the equipment, the sensor positioned to view the marking and to generate a signal indicative of a presence of the marking in a field of view of the sensor, a display disposed for viewing by the operator, the display enabling the determination of the proximity of the equipment to the marking based on the signal, and a means for transmitting the signal to the display.

The sensor means is selected to distinguish spectral characteristics of the marking from spectral characteristics of a background adjacent to said marking.

The sensor means may include a charge-coupled device (CCD) type sensor, a CMOS type sensor, or another electronic or electro-optical sensor.

The system may preferably comprise an optical filter selected to enhance discrimination of spectral radiation of the marking compared to the spectral characteristics of the radiation from the background of the marking, e.g. radiation of the surrounding vegetation.

The display may be a liquid crystal diode (LCD) array.

BRIEF DESCRIPTION OF THE DRAWINGS

The invention will be explained in more detail in the following description to be taken in conjunction with the drawings in which.

DESCRIPTION OF PREFERRED EMBODIMENTS OF THE INVENTION

The system of the invention is typically applicable for field implements that are operated under poor visibility, and wherein the boundary markers are not easily observed. Poor visibility may be caused by the distance of the marker from the operator as explained above, low solar radiation, artificial illumination conditions, soil and vegetation colors etc.

Figure 1:
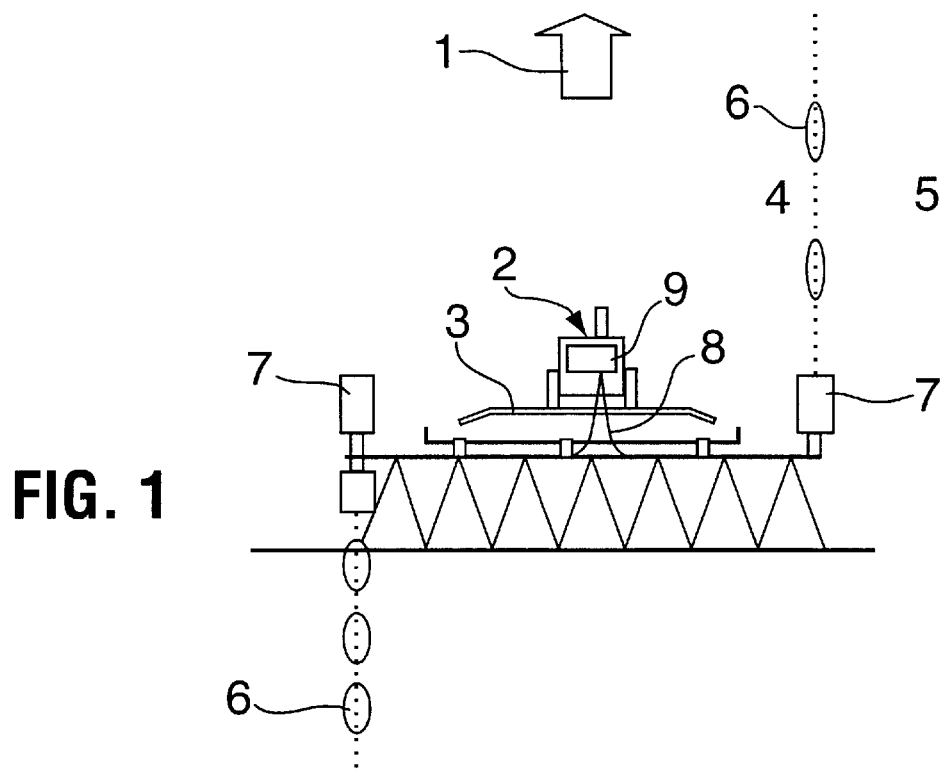
FIG. 1 is a schematic layout of an agricultural machine with the proximity detecting system of the invention.

FIG. 1 shows a crop sprayer 3 drawn by a tractor 2 over a field in a direction indicated by the arrow 1. Two optical sensor units, a left and a right unit 7 are located at the ends of spraying booms of the sprayer 3. The units are disposed such as to follow boundary markers 6 made previously by a separate foam marking equipment which is not part of the invention. The markers 6 delineate an area 5 already sprayed from an area 4 to be sprayed. The units 7 are connected with electric leads 8 to a liquid-crystal display (LCD) 9 that is mounted in the operator's cabin, not shown.

Figure 2:
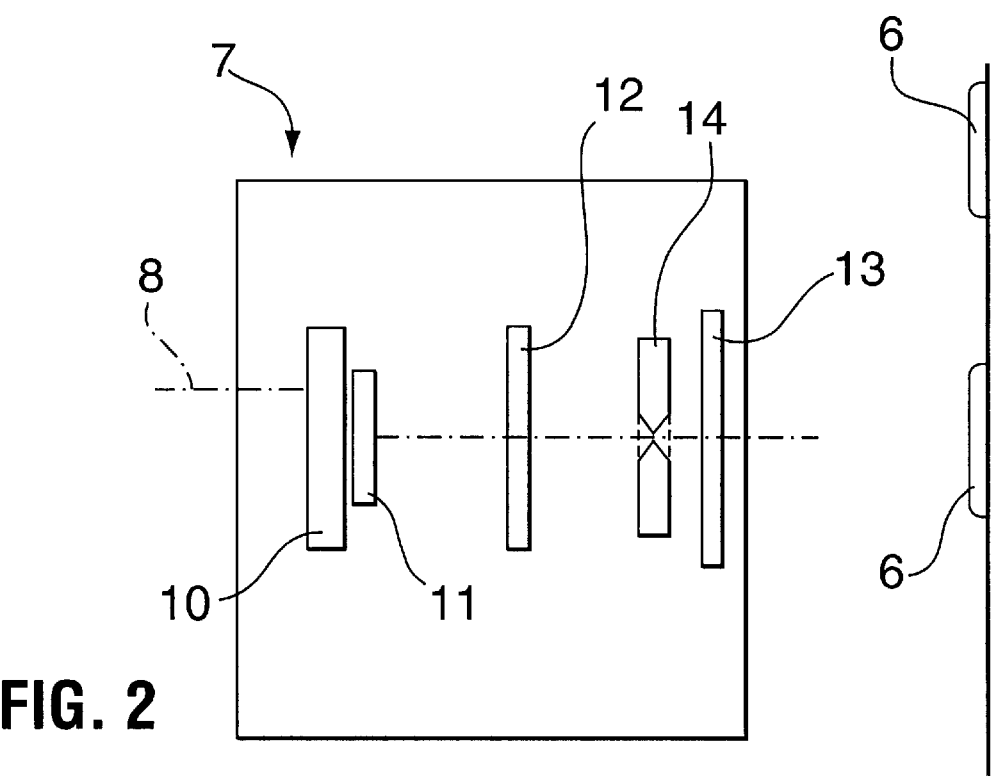
FIG. 2 is a schematic representation of an exemplary photo-electric detector placed in the vicinity of an optical marking on the ground.

As shown in FIG. 2, each optical sensor unit 7 contains a camera board 10, a sensor element embodied by a CCD array 11, an optical filter 12 selected to optimize transmission of radiation indicative of the marker 6, and a lens assembly 13. An electronic light control circuitry, not illustrated, is also provided as part of the sensor to process the input and generate a signal indicative of the proximity to the marking.

In the embodiment illustrated in FIG. 2, the filter 12 transmits red only and blocks blue, green and infra-red. The components of the sensor are all off-the-shelf components and their properties and selection are well known to those skilled in the field of imaging and do not require more specific description.

The signal generated by the CCD sensor of FIG. 2 can be transmitted to the display 9 not only via electric leads but with other known means e.g. by radio transmitters.

As an alternative to the CCD sensor, a sensor based on a complementary metal-oxide semiconductor (CMOS) may be used for the purposes of the invention.

In the drawing, the twin sensor units 7 are mounted at the ends of the two booms of the sprayer 3 such that the image of an area containing the marker 6 is covered by the field of view of the sensor and is transmitted to the display 9. To that effect, the lens assembly 13 is selected to provide an image of the field and the boundary marker from the position of the sensor 10 about 100 feet in the forward direction 1 of the implement 3.

The focal length of the lens assembly is preferably such as to image an area at a horizontal angle of approximately 40 to 60 degrees and a vertical angle of 10 to 40 degrees and to provide a resolution having a footprint of not less than 1 inch at an advance distance of 20 feet. A 200×240 photo array of cells may be used, but the invention is not limited to a particular number of pixels, of either CCD or CMOS type.

Preferably, the lens assembly 13 is equipped with an automatic iris diaphragm control 14, a feature well known in photography and optics. The diaphragm control serves to control the intensity of the light passing through the lens onto the sensor element 11, which is important if the light conditions change during the operation of the equipment 3. The diaphragm control is known to adjust for varying illumination conditions (cloud density, sun elevation, azimuth angle, direction of travel) and provide a relatively constant level of signal to the display 9.

The color of the foam marker is usually white, but the color of the background may vary. Therefore, a filter may be preferable to enhance the discrimination of the radiation emitted by the marker against the radiation emitted by the background (soil or vegetation). The sensors should preferably be selected to detect radiation within approximately 300–1000 nm range covering essentially all typical colors of the background prevalent in agriculture. Depending on whether the CCD or CMOS array is used, a filter selection will be determined by the prevalence of the green color versus other colors. For example, in high chlorophyll-content vegetation, the radiation is high in the green and very high in the IR bands, but very low in the red bands near 600–700 nm. Thus, if a white foam marker is used which has a high reflection in all bands, a filter to transmit only the red radiation would be used. If the background vegetation was mature and most of its chlorophyll was lost, the red reflection would be much higher and the green relatively lower than in the previous case. Thus, filters in the blue range would be preferred. In extreme conditions, a blue foam could be used to provide a maximum reflection compared to the mature vegetation. Of course, as mentioned above, the marking and its application is known and is not part of the invention.

The above explanations are not necessary for those skilled in the art of optics. Also, the operation of the system of the invention is evident. The operator starts the operation by positioning one of the sensors over a line of pre-applied markers and directs the equipment along the line, adjusting the direction in accordance with a deviation of the image of the marker from a reference line that may be indicated on the display.

The automatic iris diaphragm control may be replaced by other means of controlling light intensity incident on the sensor, e.g. by a manual control of light intensity (e.g. a screen) or may not be necessary at all if the lighting conditions are relatively steady.

It will be appreciated that the system of the invention is relatively simple, inexpensive, rugged and robust, thus suitable for the conditions prevalent in the agriculture, and it offers sufficient accuracy acceptable in these conditions.

I claim:

1. For use on a ground-riding agricultural equipment having a working implement extending remotely from an operator of the equipment, a system for detecting a proximity of said implement to an optical marking on the ground, the system comprising a photo-electric sensor means for generating a signal indicative of a presence of said marking in a field of view of said sensor means, said sensor means comprising an optical filter for enhancing a spectral radiation emitted by said optical marking relative to a radiation emitted by soil and vegetation surrounding said marking, said sensor means disposed on said implement remotely from the operator and proximate to the marking, a display disposed for viewing by the operator, the display enabling the determination of the proximity of the equipment to the marking based on the signal, and a means for transmitting the signal to the display.

2. The system according to claim 1 wherein said sensor means comprises a charge-coupled device.

3. The system according to claim 1 wherein said sensor means comprises a complementary metal-oxide semiconductor.

4. The system according to claim 1, wherein said optical filter is an optical filter for suppression of the spectral radiation of the soil and vegetation surrounding said marking.

5. The system according to claim 1 wherein said display comprises a liquid crystal diode array.

6. The system according to claim 1 comprising twin photo-electric sensor means located at opposite distal ends of said equipment.

7. The system according to claim 1 further comprising an automatic iris diaphragm control associated with said sensor means.

* * * * *